July 1, 1958    R. GLASER    2,841,355
DEVICE FOR TRANSMITTING THE MOVEMENT OF THE GAGING PIN
TO THE CONTROL SLIDE VALVE IN HYDRAULICALLY
OPERATED CONTROL GEAR FOR MACHINE TOOLS
Filed Aug. 24, 1954
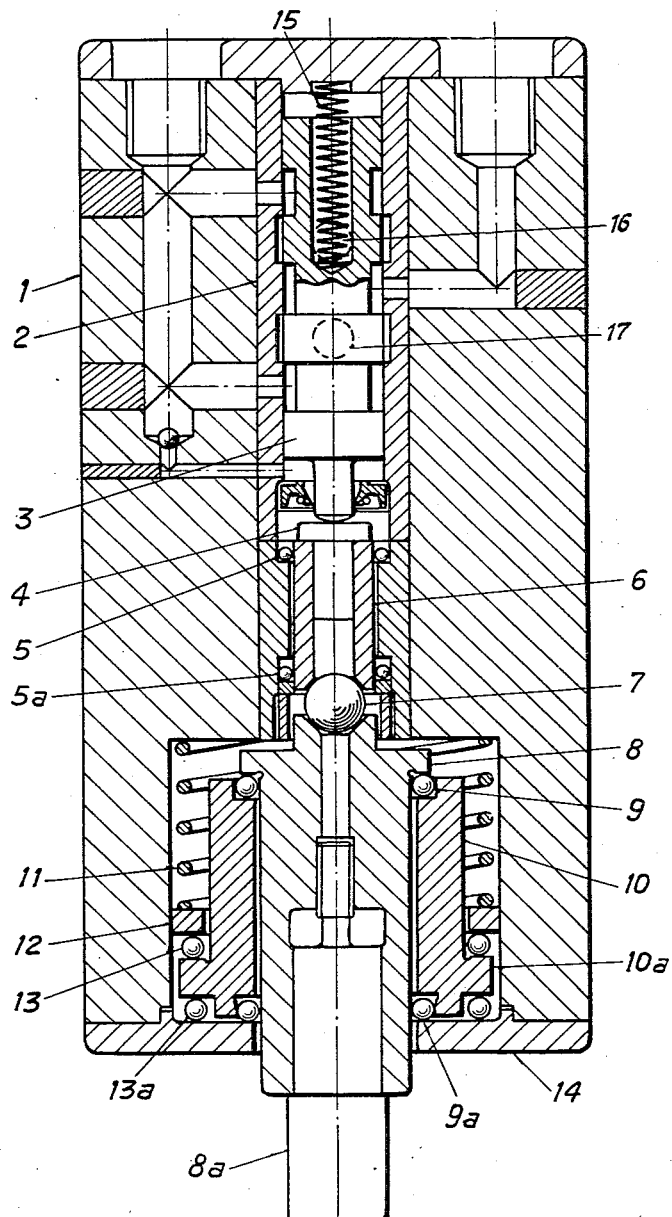
INVENTOR:
ROLF GLASER
By Richards & Geier
ATTORNEYS

United States Patent Office 2,841,355
Patented July 1, 1958

2,841,355

DEVICE FOR TRANSMITTING THE MOVEMENT OF THE GAGING PIN TO THE CONTROL SLIDE VALVE IN HYDRAULICALLY OPERATED CONTROL GEAR FOR MACHINE TOOLS

Rolf Glaser, Rorschach, Switzerland, assignor to Starrfrasmaschinen A. G., Rorschacherberg, Switzerland, a Swiss company Application August 24, 1954, Serial No. 451,782

Claims priority, application Switzerland September 8, 1953

1 Claim. (Cl. 251—3)

The present invention relates to a device for transmitting the movement of the gaging pin to the control slide valve in hydraulically operated control gear for machine tools.

Known control mechanisms of this type, in which the former pin acts directly on the control slide valve have the disadvantage that when the former pin is laterally loaded to a certain extent at steeply inclined contours of the working template, the control slide valve arranged in operative connection with the said former pin no longer reacts. For this reason the suggestion has been made to mount the former pin after the manner of a pendulum and to transform its lateral amplitude into an axial movement. This arrangement, however, has the drawback that an unequal control error results. This can only be eliminated by keeping the diameter of the gaging pin larger than that of the milling cutter. This control error, however, increases as the extension of the gaging pin, i. e. the distance between the point of swing and the gaging point, becomes longer, so that the amount by which the gaging pin diameter must exceed the diameter of the miling cutter in order to cancel out the control error, has to be calculated or tested every time.

An object of the present invention is to eliminate this disadvantage so that a once tested or calculated difference in the diameter of milling cutter and gaging pin remains constant in spite of the varying length of the gaging pin. The objects of the invention may be realized by means of an arrangement wherein the gaging pin holder is so mounted in a guide bush that it performs, in addition to an axial movement, a radial one in which its axis remains parallel to the axis of the control slide valve.

A typical embodiment of the invention is illustrated in longitudinal section in the attached drawing.

Mounted as usual in the housing 1 is a control bush 2 in which is located a control slide valve 3. The control slide valve 3 is actuated through a press plate 4 which is held in an axially shiftable bush 6 mounted without friction by means of ball bearings 5 and 5a. A gaging pin holder 8, in which the gaging pin 8a is inserted, is likewise axially shiftably supported without friction in a guide bush 10 with the aid of ball bearings 9 and 9a. This gaging pin 8a transmits the axial movements directly through the ball 7, bush 6 and press plate 4 to the control slide valve 3. The flange 10a of the guide bush 10 is pressed against the ball face 13a by means of the spring 11 on the axially shiftable press ring 12 which is mounted over the ball face 13. The ball face 13a is supported by the plate 14 which is secured to the housing 1. The ball faces 13 and 13a, as well as the flange 10a of the guide bush 10 are so designed that the guide bush 10 can be moved a certain amount between faces 13 and 13a without friction and radially to the axis of the bush. Through the action of the spring 15 on the slide valve 3, the press plate 4, the bush 6 and the ball 7, the gaging pin holder 8 together with the guide bush 10 are held in the center of the housing 1 owing to the concave tapered design of the bush 6 and of the said gaging pin holder 8. The concave tapers have preferably an angle of 90°. The sum of the angles of the two ball seats must amount to 180°, so that these angles could also be 95° and 85°. If the pattern to be gaged has flat contours, the gaging pin 8a is shifted axially and this movement is transmitted directly to the control slide valve 3. In the case of steeply inclined contours, where the lateral pressure is greater than the axial one, the guide bush 10 shifts out of the central position so that, through the ball 7 rolling down in the concave-tapered parts of the bush 6 and the gaging pin holder 8, the radial movement is transmitted to the control slide valve in an axial direction. The lateral pressure produced during the radial displacement is absorbed by the bush 6 and is not transmitted to the control slide valve. The center axis of the gaging pin holder 8 remains constantly parallel to axis of the housing 1 during its radial movement. 16 and 17 designate the inlet and outlet bores to the cylinder 2.

Having now particularly described and ascertained the nature of my said invention and in what manner the same is to be performed, I declare that what I claim is:

In a hydraulically operated control gear for machine tools, said control gear having a gaging pin and a control slide valve; a device for transmitting the movement of the gaging pin to the control slide valve, said device comprising a gaging pin holder partly enclosing the gaging pin, a guide bush guiding said gaging pin holder for axial movement jointly with the gaging pin, means engaging said guide bush solely for movement radially to the axis of the control slide valve, the axis of the gaging pin remaining parallel to the axis of the control slide valve during said radial movements of the guide bush, said gaging pin holder having a concave tapered ball seat, a bush having a concave tapered ball seat located opposite the first-mentioned ball seat, a member engaging said control slide valve and the last-mentioned bush, means supporting the last-mentioned bush for axial movement only, and a ball mounted in said ball seats for transmitting said radial movement of the guide bush to said control slide valve in an axial direction, and whereby the last-mentioned bush prevents radial pressure from being exerted upon said control slide valve.

References Cited in the file of this patent

UNITED STATES PATENTS

| | | |
|---|---|---|
| 2,083,774 | Campbell | June 14, 1937 |
| 2,130,109 | Turchan | Sept. 13, 1938 |
| 2,331,817 | Turchan | Oct. 12, 1943 |
| 2,386,825 | Turchan | Oct. 16, 1945 |